(No Model.)

C. H. LOW.
DRIVE CHAIN.

No. 261,243. Patented July 18, 1882.

Witnesses
W. C. Coilies
Geo. R. Cutler.

Inventor
Charles H. Low.
By Coburn & Wheeler
Attorneys

UNITED STATES PATENT OFFICE.

CHARLES H. LOW, OF SANDWICH, ILLINOIS, ASSIGNOR OF ONE-HALF TO J. PHELPS ADAMS, OF SAME PLACE.

DRIVE-CHAIN.

SPECIFICATION forming part of Letters Patent No. 261,243, dated July 18, 1882.

Application filed March 25, 1882. (No model.)

*To all whom it may concern:*

Be it known that I, CHARLES H. LOW, a citizen of the United States, residing at Sandwich, in the county of De Kalb and State of Illinois, have invented certain new and useful Improvements in Drive-Chains, fully set forth in the following specification, reference being had to the accompanying drawings, in which—

Figure 1:
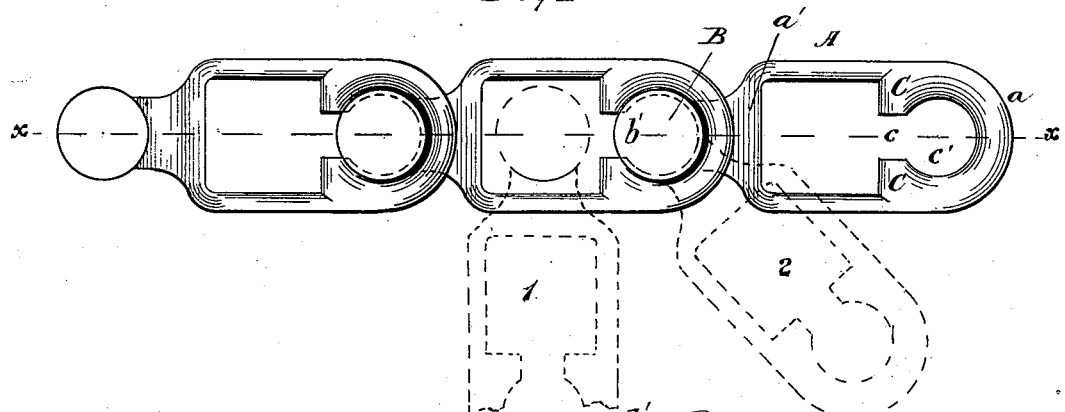
Figure 2:
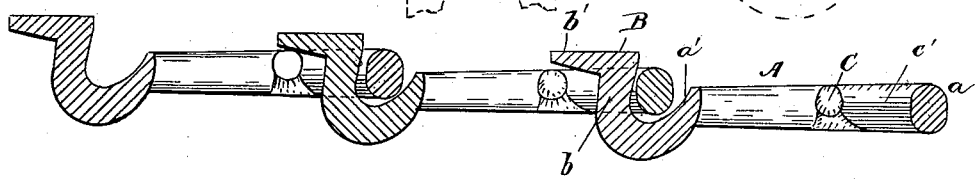
Figure 3:
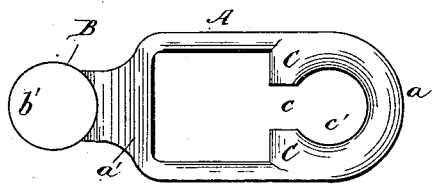

Figure 1 represents a plan view of a section of chain embodying my invention, the position of the links in coupling being shown in dotted lines; Fig. 2, a longitudinal section of two links coupled together, taken on the line $x\ x$ in Fig. 1; Fig. 3, a plan view of a single link detached; and Fig. 4, a perspective view of the same, looking toward the hook end.

My invention relates to that class of chains especially intended for use as drive-chains, and composed in whole or part of links, which are readily coupled and uncoupled, as occasion may require. Such links are frequently called "detachable links;" and the present invention consists in a special construction of the links, whereby this detachable feature is obtained.

I will proceed to describe in detail one mode in which I have carried out my invention in practical form, and will then point out definitely in the claims the particular improvements which I believe to be new and desire to protect by Letters Patent.

In the drawings, A represents a single link of a drive-chain. These links are provided with a hook, B, at one end, and the opposite end, $a$, is of oval shape. The links are entire, and are provided with an open central space for the reception of the projections on a sprocket-wheel in the usual way. The transverse bar $a'$ at the hook end of the link is substantially straight, and presents a substantially straight interior face, though the contour is to be adapted to the shape of the sprockets. The central open space does not extend from end to end of the links, but back some distance from the hook end are two projections, C, extending directly inward from the respective side bars of the links, as shown in Fig. 3 of the drawings, but not meeting at their inner ends, an opening, $c$, being left between them. The sides of the projections toward the hook are substantially straight, so as to present substantially square shoulders for sprocket-bearings. The opposite sides of the projections are curved so that they are finally merged in the curved end of the links, thereby forming a circular opening, $c'$, back of the projections and somewhat wider transversely of the link than the opening $c$ between the two projections.

Figure 4:
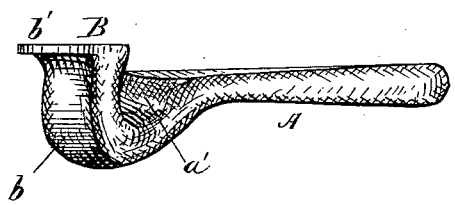

The hook B is formed on the end bar, $a'$, the shank $b$ being bent down below the plane of the bar and then turned up in front of the latter, and terminating in a circular button or head, $b'$, above the plane of the bar, as shown in Fig. 4 of the drawings, the button being of larger area than the cross-section of the hook. The body, or at least the upright portion, of the hook is of considerably greater thickness in one direction than the other, the greater thickness being in a line transverse to the link, so that the hook has an oblong or somewhat oval shape in cross-section, as shown in Fig. 4 of the drawings, its inner face being adapted to fit substantially the circular opening $c'$ at the inner end of the link. This hook is also of such dimensions that when turned edgewise the upright portion will pass through the opening $c$ between the projections on the side bars of the link, while the broad side thereof is much wider than this opening. The head or button at the top of the hook is also made larger than the circular opening at the end of the link, so that the button cannot be passed through the latter. It is also preferably made with its forward portion projecting outward and forward beyond the body of the hook, as shown in the drawings, though this is not absolutely necessary. Preferably the entire inner surface of the hook is curved for the purpose of providing a more suitable bearing for the round end of the link, though of course if the latter is shaped differently the shape of the hook may be changed accordingly. The larger or sprocket opening of the links is somewhat larger than the button on the end of the hook, so that the latter may be freely passed through the former.

In operation these links are coupled together as follows: The button on the hook of one link is passed through the main opening of another link, and, the two being held at right angles to each other, as shown in dotted lines at 1 in Fig. 1 of the drawings, the former link is carried back, and the upright portion of the hook passes through the opening between the projections C into the opening $c'$ at the end of the hook, as shown in dotted lines at 2 in Fig. 1 of the drawings. The hook turns freely in this latter opening, so that the links are moved slightly out of line with each other by turning one upon the other in the position shown in full lines in same figure. Obviously, now, the links are securely coupled, for the button cannot pass through the opening $c'$, and the broad side of the hook being presented to the opening $c$, it cannot pass out through this opening. At the same time the open space in front of the projections is free for the reception of the sprockets, which find a firm bearing at each end of the space.

Owing to the depression of the hook below the end bar, the links, when coupled, will lie in nearly the same plane; and it is evident that the coupling-joint is a very free one, permitting the ready movement of the links upon each other and avoiding stiffness in the chain. The hook is of sufficient length to give a slight vertical movement, and as it is somewhat smaller than the opening in which it is received in the companion link, a lateral vibratory movement or play of the links upon each other is provided for, so that the chain may be readily crossed and used in the ordinary way of a cross-belt, there being no stiffness in the chain to prevent this.

The links are uncoupled by reversing the operation of coupling described above.

Drive-chains may be made in whole or part from links of this description, and, in fact, these links described are intended to be applied wherever detachable chain-links have heretofore been employed.

In some respects the peculiarities of form and arrangement described above may be modified without changing the principle of construction and operation, and therefore I do not limit myself to the peculiar details of construction herein shown and described, provided always that the links embody the main elements of my improvement, so as to be coupled and uncoupled with substantially the same principle of operation. For instance, the opening for the coupling-hook may, perhaps, be located differently in respect to the link, and the buttoned hook be introduced into this opening in a different manner; or the direction of the passage connecting the main opening with the coupling-opening may be changed somewhat, so that the links in coupling and uncoupling are held at some other angle to each other than the one described above, or other similar modifications which still leave the general principle of operation the same.

Having thus described my invention, what I claim as new, and desire to secure by Letters Patent, is—

1. A drive-chain composed in whole or part of links provided with a central opening, which is divided into two unequal parts connected by a narrow passage, and having a button or headed hook at one end larger than the coupling-opening, the shank of which hook may be passed through the passage connecting the two openings when the links are held in an unusual position, but when the latter are straightened out is prevented from passing out of the coupling-opening, substantially as and for the purposes set forth.

2. A drive-chain link provided with a central opening for sprockets, and a smaller opening in the end opposite the former for the reception of a coupling-hook having a head larger than the smaller opening in an adjacent link, the two openings being connected by a narrow passage, through which the coupling-hook may be passed when held in an unusual position, substantially as described.

3. In drive-chains, a link provided with a coupling-opening at one end distinct from the sprocket-opening, in combination with an adjacent link provided with a hook having a substantially upright headed shank with the head larger than the coupling-opening, which may be inserted therein when held in an unusual position, but is prevented from passing out of the latter when the links are brought into line with each other, substantially as described.

4. A drive-chain link provided with a central opening for the reception of sprockets, projections C, extending inward from the side bars, an opening, $c'$, in rear of the projections and smaller than the central opening, and a narrow passage, $c$, between the inner ends of the projections and connecting the two openings, and having at the opposite end a coupling-hook, B, with an enlarged head, $b'$, substantially as and for the purposes set forth.

5. A drive-chain link provided at one end with a coupling-hook, B, bent downward and upward, and having its shank $b$ considerably wider than its thickness, and with a button or enlarged head, $b'$, on its upper end, in a plane parallel to the face of the link, substantially as described.

CHARLES H. LOW.

Witnesses:
 M. H. LOSEE,
 W. C. PHELPS.